(12) United States Patent
Garcia

(10) Patent No.: US 10,465,381 B2
(45) Date of Patent: Nov. 5, 2019

(54) UNIVERSAL BARRIER SYSTEM PANELS

(71) Applicant: Juan Garcia, Tempe, AZ (US)

(72) Inventor: Juan Garcia, Tempe, AZ (US)

(*) Notice: Subject to any disclaimer, the term of this patent is extended or adjusted under 35 U.S.C. 154(b) by 613 days.

(21) Appl. No.: 14/215,146

(22) Filed: Mar. 17, 2014

(65) Prior Publication Data

US 2014/0272320 A1 Sep. 18, 2014
US 2016/0237679 A9 Aug. 18, 2016

Related U.S. Application Data

(63) Continuation-in-part of application No. 12/039,483, filed on Feb. 28, 2008, now abandoned.

(Continued)

(51) Int. Cl.
*B29C 44/32* (2006.01)
*B29C 44/34* (2006.01)
(Continued)

(52) U.S. Cl.
CPC ............. *E04B 1/78* (2013.01); *B29C 44/321* (2016.11); *B29C 44/326* (2013.01);
(Continued)

(58) Field of Classification Search
CPC ... B29C 66/45; B29C 65/7897; B29C 66/712; B29C 66/727; B29C 66/73113; B29D 99/0053; B29K 2623/06; B29K 2715/003; B29K 2675/00; B29L 2031/10; E04B 1/78; E04B 1/76; E04B 1/6803; E04B 1/88; E04B 1/665; E04B 2001/7691; E04B 2001/742; E04B 1/803; B32B 27/08; B32B 27/065; B32B 7/12; B32B 15/046; B32B 3/04; B32B 15/085; B32B 15/20; B32B 2266/0264; B32B 2266/0278;
(Continued)

(56) References Cited

U.S. PATENT DOCUMENTS 3,121,649 A * 2/1964 Oliver ..................... E04D 3/351
156/229
4,303,732 A * 12/1981 Torobin .................. B29C 49/46
126/709
(Continued)

*Primary Examiner* — Nathan L Van Sell
(74) *Attorney, Agent, or Firm* — Paul B. Heynssens Attorney at Law PLC

(57) ABSTRACT

A universal barrier system includes universal barrier components that may be assembled together to shield floors and walls from moisture and provide a thermal break in an operational area of the universal barrier component. A lap zone of the universal barrier component may allow universal barrier components to be assembled and installed to protect floors, walls, ceilings, footings and the like from moisture and heat gain or loss by minimizing the need for tapes and other joining methods. The universal barrier system may also act as a sound deadening material. The operational area and lap zone of the universal barrier component may be disposed on a vapor block layer to provide some rigidity. The operational area of the universal barrier component may include a thermal break disposed upon the vapor block layer. The thermal break may include an outer protective layer. In addition, universal barrier tape and universal barrier edging may be provided to couple adjoining universal barrier components.

6 Claims, 12 Drawing Sheets

Related U.S. Application Data

(60) Provisional application No. 60/895,932, filed on Mar. 20, 2007, provisional application No. 61/802,611, filed on Mar. 16, 2013.

(51) Int. Cl.

| | | |
|---|---|---|
| *B29C 44/56* | (2006.01) | |
| *B29C 65/00* | (2006.01) | |
| *B29C 65/78* | (2006.01) | |
| *B29D 99/00* | (2010.01) | |
| *B32B 15/04* | (2006.01) | |
| *B32B 15/085* | (2006.01) | |
| *B32B 15/20* | (2006.01) | |
| *B32B 27/06* | (2006.01) | |
| *B32B 27/08* | (2006.01) | |
| *B32B 3/04* | (2006.01) | |
| *B32B 7/12* | (2006.01) | |
| *E04B 1/66* | (2006.01) | |
| *E04B 1/68* | (2006.01) | |
| *E04B 1/74* | (2006.01) | |
| *E04B 1/76* | (2006.01) | |
| *E04B 1/78* | (2006.01) | |
| *E04B 1/80* | (2006.01) | |
| *E04B 1/88* | (2006.01) | |
| *C08J 9/32* | (2006.01) | |
| *B29C 43/24* | (2006.01) | |
| *B29K 105/16* | (2006.01) | |
| *B29K 623/00* | (2006.01) | |
| *B29K 675/00* | (2006.01) | |
| *B29L 31/10* | (2006.01) | |

(52) U.S. Cl.
CPC ...... *B29C 44/3442* (2013.01); *B29C 44/5681* (2013.01); *B29C 65/7897* (2013.01); *B29C 66/45* (2013.01); *B29C 66/712* (2013.01); *B29C 66/727* (2013.01); *B29C 66/73113* (2013.01); *B29D 99/0053* (2013.01); *B32B 3/04* (2013.01); *B32B 7/12* (2013.01); *B32B 15/046* (2013.01); *B32B 15/085* (2013.01); *B32B 15/20* (2013.01); *B32B 27/065* (2013.01); *B32B 27/08* (2013.01); *C08J 9/32* (2013.01); *E04B 1/665* (2013.01); *E04B 1/6803* (2013.01); *E04B 1/76* (2013.01); *E04B 1/88* (2013.01); *B29C 43/24* (2013.01); *B29K 2105/165* (2013.01); *B29K 2623/06* (2013.01); *B29K 2675/00* (2013.01); *B29K 2715/003* (2013.01); *B29L 2031/10* (2013.01); *B32B 2266/0264* (2013.01); *B32B 2266/0278* (2013.01); *B32B 2307/304* (2013.01); *B32B 2307/7265* (2013.01); *B32B 2419/00* (2013.01); *E04B 1/803* (2013.01); *E04B 2001/742* (2013.01); *E04B 2001/7691* (2013.01); *Y10T 428/24752* (2015.01)

(58) Field of Classification Search
CPC ...... B32B 2307/304; B32B 2307/7265; B32B 2419/00; Y10T 428/24752
See application file for complete search history.

(56) References Cited

U.S. PATENT DOCUMENTS

| | | | | |
|---|---|---|---|---|
| 4,625,486 | A * | 12/1986 | Dickinson | E04B 1/66 52/404.1 |
| 4,974,382 | A * | 12/1990 | Avellanet | E04B 1/78 428/457 |
| 5,617,687 | A * | 4/1997 | Bussey, Jr. | E04B 1/762 156/71 |
| 5,952,076 | A * | 9/1999 | Foster | B32B 27/32 428/215 |
| 6,256,956 | B1 * | 7/2001 | Davis | E06B 1/62 277/645 |
| 2003/0113534 | A1 * | 6/2003 | Poisson | C09J 7/0246 428/343 |
| 2004/0103608 | A1 * | 6/2004 | Lionel | E04D 12/002 52/408 |
| 2006/0135636 | A1 * | 6/2006 | Zhu | C08G 18/3895 521/172 |
| 2006/0210753 | A1 * | 9/2006 | Kadlec | B32B 5/022 428/41.8 |
| 2008/0233358 | A1 * | 9/2008 | Garcia | E04F 15/18 428/189 |

\* cited by examiner

Edging Material
400

Lamination of Components
to Create Universal Barrier
Component

Plan View of Slab Foundation
Insulation Utilizing Universal
Barrier Components
1100

UNIVERSAL BARRIER SYSTEM PANELS

CROSS-REFERENCE TO RELATED APPLICATION

This application is a continuation in part of U.S. patent application Ser. No. 12/039,438, filed Feb. 28, 2008, which claims the benefit of U.S. Provisional Patent Application No. 60/895,932 filed Mar. 20, 2007 the disclosures of which are incorporated herein by reference. This application also claims the benefit of U.S. Provisional Patent Application No. 61/802,611 filed Mar. 16, 2013 the contents of which are hereby incorporated by reference.

TECHNICAL FIELD

This description relates generally to building construction and more specifically, to thermal breaks and moisture or vapor barriers.

BACKGROUND

In building construction, a great amount of effort is typically expended in shielding the building interior and its inhabitants from the elements. In particular, a building typically shields its occupants from moisture, heat and cold. In addition, moisture can be harmful to the building structure itself. The roof, walls and floor of a building typically include a number of components provided to resist the elements. For example, a wall may include exterior shingles, sheeting, insulation, a frame and interior plaster. A floor may include a foundation footing, a concrete slab and a reinforcing mesh.

Existing structural components have traditionally provided adequate shielding when they were developed. However, as times have changed, energy costs have risen, which tend to make improved insulation more important. Also, as time goes on, builders typically seek to improve the quality and cost effectiveness of their construction methods. An area that could be improved, is providing cost effective moisture and vapor barriers that may tend to more effectively protect a building and its occupants. In particular, insulating materials that may utilize chemical compositions that are energy efficient may be desirable.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a universal barrier system that tends to reduce the vapor and moisture intrusion into a structure. The universal barrier system may utilize a unique insulating material made from polyurethane polymers that include a microsphere (hollow glass bubble) material to improve their insulating properties. The universal barrier system may also provide a thermal break for improved insulation. The universal barrier system includes universal barrier components that may be assembled together to shield floors and walls from moisture and provide a thermal break in an operational area of the universal barrier component. A lap zone of the universal barrier component may allow universal barrier components to be assembled and installed to protect walls, floors, footings and the like from moisture and from heat gain or loss. The operational area and lap zone of the universal barrier component may be disposed on a vapor block layer to provide some rigidity. The operational area of the universal barrier component may include a thermal break disposed upon the vapor block layer. The thermal break may include an outer protective layer. The universal barrier components may be disposed upon a roll during manufacturing, for easy transport and installation. In addition, tape may be provided to couple adjoining universal barrier component panels.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
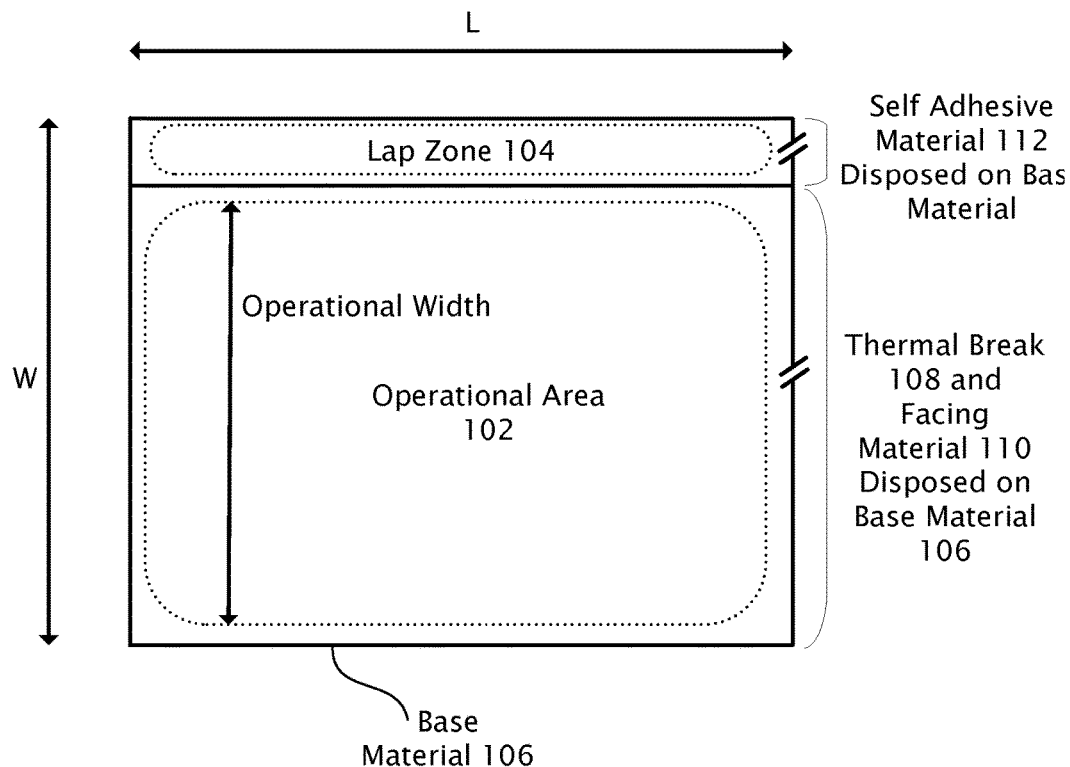
FIG. 1 is a plan view of a universal barrier component.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The assemblage of components described below may be advantageously assembled in a variety of applications, or may be termed universal as a set of a few standardized components may be universally applied in a variety of applications. The various components advantageously utilize a series of thin sheets on a roll laminated together to provide desired properties that are light weight, flexible, formable, shapeable, have high performance resistance to thermal, vapor, moisture and sound migration, and come in easily transportable in rolls.

The examples below describe a vapor or moisture barrier system that may include a thermal break. The system advantageously utilizes conveniently formed, and typically rolled components whose shape and construction facilitate transportation and application at the job site. Although the present examples are described and illustrated herein as being implemented in a building construction system, the system described is provided as an example and not a limitation. As those skilled in the art will appreciate, the present examples are suitable for application in a variety of different types of thermal and moisture barrier systems. For example the various components may be utilized in walls, roofs, ceilings, around windows and doors, under concrete slabs, stem walls, and the like. Because of the wide applicability of these insulating and moisture blocking components they may be said to create a universal barrier system or a building barrier system when assembled or otherwise integrated into building construction.

Various standards are named herein. Such references are used to indicate that the examples described herein are in compliance with the various standards mentioned at the time of this writing. As used herein ACI 302-1R refers to American Concrete Institute ("ACI")'s standard Guide for Concrete Floor and Slab Construction. American Society for Testing Materials ("ASTM") standard ASTM D-1709 refers to the standard for "Standard Test Methods for Impact Resistance of Plastic Film by the Free-Falling Dart Method", ASTME E-154 refers to the standard for "Standard Test Methods for Water Vapor Retarders Used in Contact with Earth Under Concrete Slabs, on Walls, or as Ground Cover", ASTME 1643-98 refers to the standard for "Standard Practice for Vapor Barriers", ASTME 1745-97 refers to the standard for "Plastic Vapor Barriers" and ASTME 1993-98 refers to the standard for "Bituminous Vapor Barriers"

As an overview, the present example provides a universal barrier system that tends to reduce the vapor and moisture intrusion into a structure. The universal barrier system may also provide a thermal break for improved insulation and noise attenuation. The universal barrier system may be disposed under a floor, or slab, and may also be assembled to insulate building footings. In walls, the universal barrier system may be assembled to limit moisture intrusion and provide insulation.

The universal barrier system includes universal barrier components that may be assembled together to shield floors and walls from moisture and provide a thermal break in an operational area of the universal barrier component. An operational area is a region that includes a layered structure of a base component, insulation, and an optional protective layer that provides insulation/vapor blocking properties. The universal barrier system may also act as a sound deadening material. A lap zone of the universal barrier component may allow universal barrier components to be assembled and installed to protect walls, floors, footings and the like from vapor, moisture, and from heat gain or loss by minimizing the need for tapes and other joining methods. The operational area and lap zone of the universal barrier component may be disposed on a vapor block layer to provide some rigidity. The operational area of the universal barrier component may include a thermal break disposed upon the vapor block layer. The thermal break may include an outer protective layer. In addition, tape may be provided to couple adjoining universal barrier components.

The universal barrier components may be disposed upon a roll during manufacturing for easy transport and installation. Disposition and lamination may be advantageously accomplished simultaneously by a hybrid process of disposing a thermal break between the outer protective layer and vapor block layer. A typical vapor block layer may be provided by polyethylene, Polyolefin (Copolymer of Ethylene and Hexene: (CH2-CH2)n), Polyolefin EVOH (Ethylene Vinyl Alcohol Copolymer Copolymer of Ethylene and Octene-1: (CH2-CH2)n) such as found in the exemplary VaporBlock™ material produced by Raven Industries of Sioux Falls, S. Dak. or its equivalent. These concepts will be described in detail in the following paragraphs.

FIG. 1 is a plan view of a universal barrier component 100. The universal barrier component 100 may be a part of a universal barrier system that may include other thermal breaking components and or moisture barriers and vapor barriers. In general the universal barrier component is substantially a flexible laminated structure configured so that it may easily be transported to a jobsite and cut and joined by workers as needed to conform with the structure in which it is being disposed. The components may easily joined without protruding seams where adjoining materials are lapped together. A typical universal barrier system may include the universal barrier component, insulating edging, and seaming tapes applied as needed in a given application, such as the construction of a building.

In particular, a universal barrier system for a floor or concrete slab may include multiple universal barrier components 100 coupled together to provide a thermal break and/or a moisture barrier under concrete or other flooring materials. Further, universal barrier systems may include the universal barrier component 100 coupled together and forming insulated footings and the like. Such a flooring system utilizing universal barrier components 100 may also extend to, and be coupled to, building walls that may or may not include the universal barrier components 100, and in a similar manner to roof components to form a building envelope providing thermal breaks and a moisture vapor barrier.

Universal barrier component 100 includes an operational area 102 and a lap zone 104. A typical overall width for a universal barrier component 100 is 54 inches, with a six inch wide lap zone 104 for overlap and a 48 inch wide operational area 102. In alternative examples, other widths of lap zone and operational area may be utilized. The universal barrier component 100 may be fabricated in any suitable length ("L"). The universal barrier component 100 is somewhat flexible and easy to work with. Also, the universal barrier system component 100 may be supplied in convenient lengths on a roll or alternatively in sheets cut to a given length. The operational area 102 and lap zone 104 of the universal barrier component 100 are typically disposed on a common base material 106.

The operational area 102 typically includes a vapor blocking base material or substrate 106, a thermal break, or insulation material 108, and a facing material 110 over the thermal break. This portion of the universal barrier component provides insulation properties in the overall assembly. The operational area 102 typically includes a thermal break 108 disposed on the base material 106. The operational area may also include an outer layer of facing material 110 disposed over the thermal break 108. The outer layer is typically a lighter weight material suitable for protecting the material making up the thermal break 108.

The lap zone 104 allows substantially flush seams to be created when joining universal barrier components into larger assemblies, as this area is thinned because of the absence of the insulating material, and typically just being an extension of the base component past the insulation and outer protective area. The lap zone allows the first universal barrier component to be assembled to the operational area of a second universal barrier component with their operational areas substantially joined. The lap zone 104 may include a self-adhesive material 112 disposed on the base material 106, for coupling the universal barrier component 100 to the adjoining operational area of an adjoining universal barrier component of a plurality of universal barrier components. The adhesive may be any conventional type suitable for use in the disclosed configuration. The adhesive may be protected by a non-sticking backing material that may be peeled away to couple the universal barrier component to an adjoining universal barrier component, universal barrier insulated edging, or other structural component. Alternatively the lap zones may be supplied without adhesive and joined by tape, although this creates the need for an additional component when putting the barrier components together in a construction project.

Figure 2:
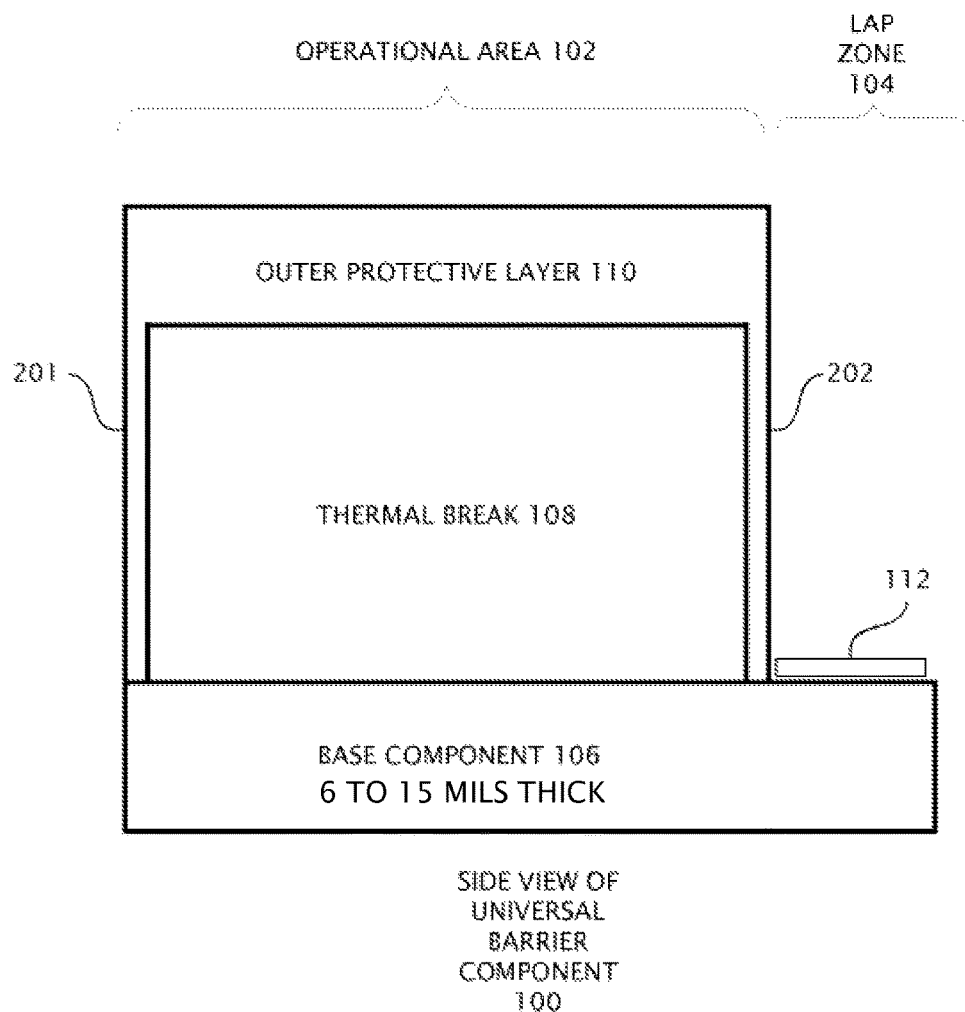
FIG. 2 is a profile view of the universal barrier component of FIG. 1.

FIG. 2 is a profile view of the universal barrier component 100 of FIG. 1. The profile in the operational area 102 and the lap zone 104 are shown. The somewhat flexible vapor block layer forms a base component or base material 106 of the universal barrier component 100, which is a common base material 106 for both the lap zone 104 and operational areas 102. The vapor block layer 106 may be made of a polyethylene film made of virgin resin of a high tensile strength typically exceeding ASTM E-1745 class A, B and C requirements or its equivalent.

An exemplary base material 106 would be the polyethylene film manufactured by Raven Industries of Sioux Falls, S. Dak. and sold under the trade name VaporBlock™ 10 which may be of 10 mils in thickness. A suitable tensile strength for this material would be as defined in ASTME E-154 Section 9 and having a strength of 52 pounds per inches for new material and 55 pounds per inch after soaking. Puncture resistance would be as defined ASTM D-1709 Method B and would be 2600 grams. A typical use of that temperature range would be −70° F. to 180° F., and a typical new material permanence for a vapor block layer would be 0.036 Perms. In alternative examples, different thicknesses of the rigid vapor block layer 106 may be used, for example, 6 and 15 mils, or the like.

The base material 106 is a vapor block layer that typically impedes the transmission of water vapor from traveling upward through a concrete slab-on-grade or through a concrete or masonry wall. Installation of the vapor block layer 106 should be such that it is not punctured to preserve its properties. Thus, adhesive joining as previously described may be advantageous.

Thermal break 108 typically includes an insulating material such as long chain polymers disposed over the base material 106 in the operational area 102. The thermal break may vary in thickness but may typically range from 5 mils to 50 mils, depending on the insulation material and the degree of insulation desired. Typical thermal break materials may include long chain polymers, such as polyethylene, polystyrene, polypropylene, polyvinyl chloride, for example, that include foams and silicones. These materials tend to improve the thermal performance of the universal barrier components in various configurations.

In a particular example, long chain polymers of polystyrene that are disposed on the base layer by a hybridized process having two stages including extrusion and blowing may produce a thermal break material that is closed cell in construction, easily disposed and flexible (unlike the typically rigid white polystyrene building panels typically found in the building industry). The thickness of polystyrene closed cell material may vary but may typically range from 5 mils to 50 mils, depending on the degree of insulation desired.

In a further alternative example of a thermal break, a urethane, or equivalent material having insulating bubbles or microspheres specially compounded as described herein may be utilized as a thermal break material. This urethane material introduces insulating voids is flexible and may be easily applied on the base material. The thickness of urethane with micro spheres may vary but may typically range from 5 mils to 50 mils, depending on the degree of insulation desired.

The outer protective layer 110 typically includes a facing material such as aluminum foil (or its black body equivalent) or a polyethylene film (or its equivalent) to protect the thermal break from damage and to increase resistance to moisture. The aluminum foil would typically include high purity aluminum for reflectivity. Aluminum foil of this type would typically range from 3 mils to 10 mils, depending on the degree of reflection or conduction desired. The outer protective layer protects the material making up the thermal break 108 from moisture and abrasion. The use of high purity aluminum (97% or higher) typically improves the overall thermal performance of the thermal breaking properties of the universal barrier component for certain applications.

An outer protective layer of polyethylene film may alternatively be utilized. It is typically the same material as described above for the base material 106, but usually thinner. The thickness of polyethylene film material may vary but may typically range from 3 mils to 40 mils, depending on the degree of insulation desired. The outer protective layer 110 may also be sealed against the base component 106 around the edges of the operational area 201 and 202 to provide additional protection to the thermal break material 108 that it is covering.

Figure 3:
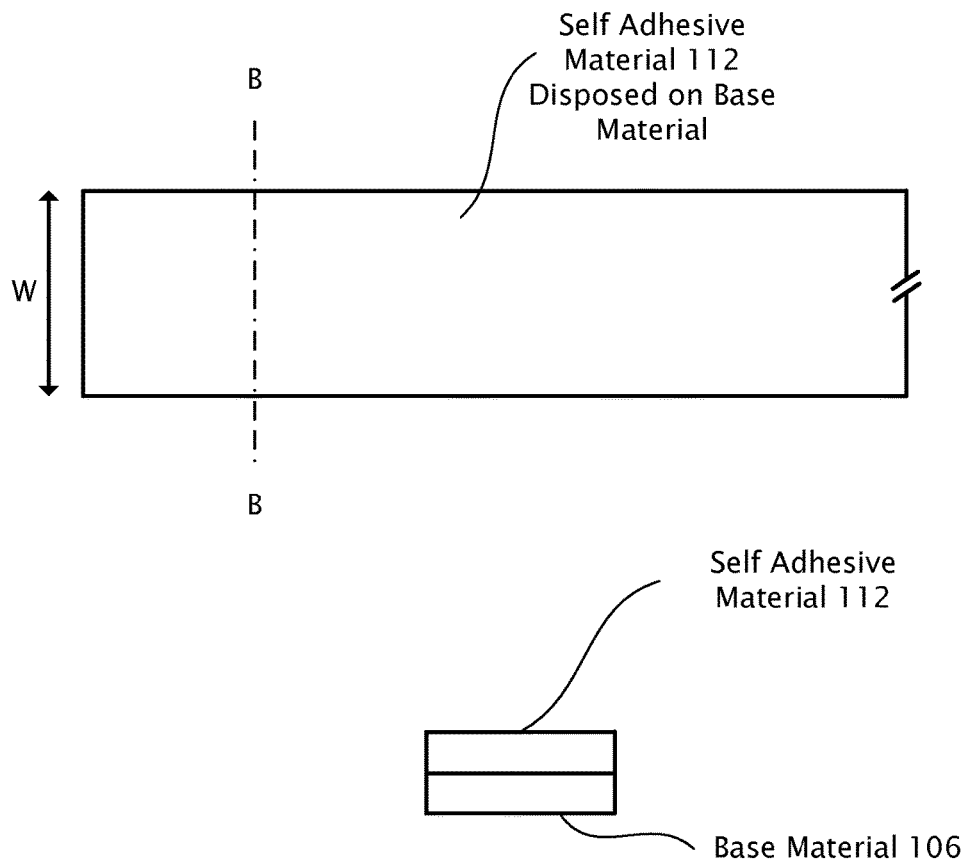
FIG. 3 is a plan view and a profile view of a universal barrier component bonding tape.

FIG. 3 is a plan view and a profile view of a universal barrier component bonding tape, or equivalently universal barrier tape. A universal barrier bonding tape, or alternatively universal barrier tape, may be used to join universal barrier component 100 to other universal barrier components (in particular universal barrier components lacking adhesive in the lap zone) or to structural features to which the universal barrier components are being applied. Bonding tapes may typically be up to 12 inches wide and may be made of a "VaporBlock 10"™ material and a conventional adhesive. The bonding tapes typically provide 6 inches of lap as specified in ACI 302-1R. The tape is typically supplied on rolls. However it may equivalently be supplied in strips, or precut lengths. Alternatively the bonding tape may be double sided with adhesive on both surfaces.

The universal barrier tape material is of the same vapor barrier specified in the base component or material. This exemplary 12" tape is directed at addressing the short width of material at the "operational area" and "lap zone". This 12" element or vapor barrier tape allows for 6" of overlap (lap zone) on the short ends of the rolled material to provide the 6" lap as specified in ACI 302-1R when executing a joint on the short width of the material. The universal barrier tape provides a solution for the secondary and tertiary functions of vapor and moisture migration on the widths of the roll material. This element of Universal Barrier tape also serves to allow custom fabrication (cutting and shaping of the "operational area") for conformation around room entries, support points (columns and pillars) utility and drain points without loss of continuity of the vapor and moisture migration material in the 6" overlap on either side of the fabricated cut or seam of the operational area to provide a complete system of continuity as specified in ACI 302-1R compliance.

Figure 4:
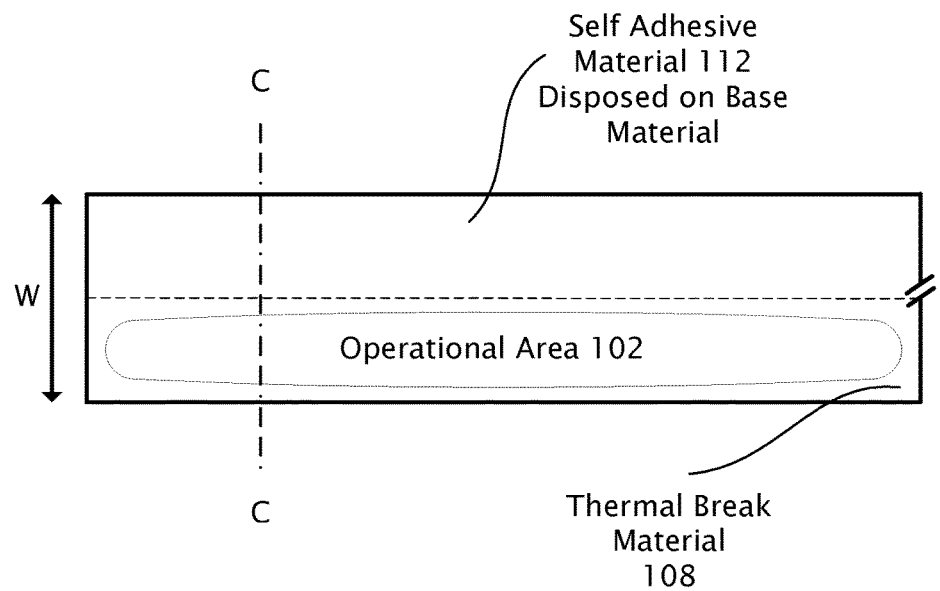
FIG. 4 is a plan view and a profile view of a universal barrier component edging material.
Figure 4:
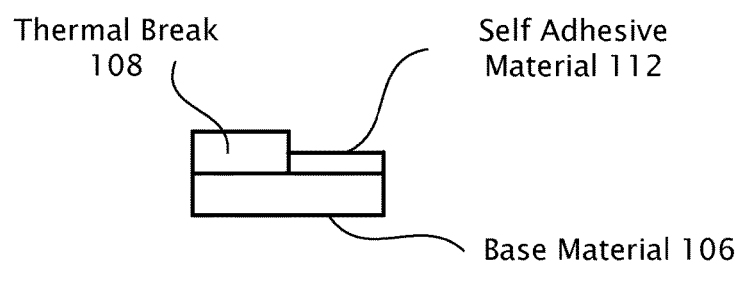

FIG. 4 is a plan view and a profile view of a universal barrier component edging material, or universal edging material. It is similar in construction to the universal barrier component (100 of FIG. 1), however, its operational area 102 tends to be narrower in width. Insulated universal barrier edgings of the same insulting materials 102 as previously described and, may be provided in typical widths of 12 to 14 inches to join universal barrier components to each other and to the structure being insulated. The insulated edgings typically provide insulating materials from 6 to 8 inches wide and have a lap zone typically 6 inches wide, covered with the previously described adhesive in compliance with ACI 302-1R. The configuration is similar to that of the previously described universal barrier component 100, but with substantially narrower widths of operational areas.

The universal edging material is a version of the exemplary 12" tape roll material where 6" of the thermal insulation material is disposed on ½ of the 12" width of the tape leaving the remaining 6" of the vapor barrier material as the "lap zone". This universal edging material is directed at providing a solution to vertical edges such as where stem walls and load bearing points meet the horizontal flat work surfaces on the concrete floor.

The Barrier edging material is also intended to allow smaller sections of universal barrier material to be custom fabricated in 6" applications. This would allow for a 12" or 18" (6" widths assembled to any application) insulated area to be constructed out of the universal barrier edging material in lieu of cutting these widths out of the larger roll material, reducing waste and promoting ease of use in detailing smaller areas with the universal barrier material.

As can be seen from the above description the combination of components provides a universal barrier system that is designed to insulate the building envelope, providing solutions for large areas, short side width seams and custom fabrication as well as vertical surfaces that interface with horizontal applications as in under the concrete floor and small area detail insulation needs. The universal barrier system assembled from the components described above provides walls, ceiling and roof areas the same thermal, vapor and moisture benefits as needed in the under the concrete floor application. Sound attenuation is also provided by the universal barrier system.

Figure 5:
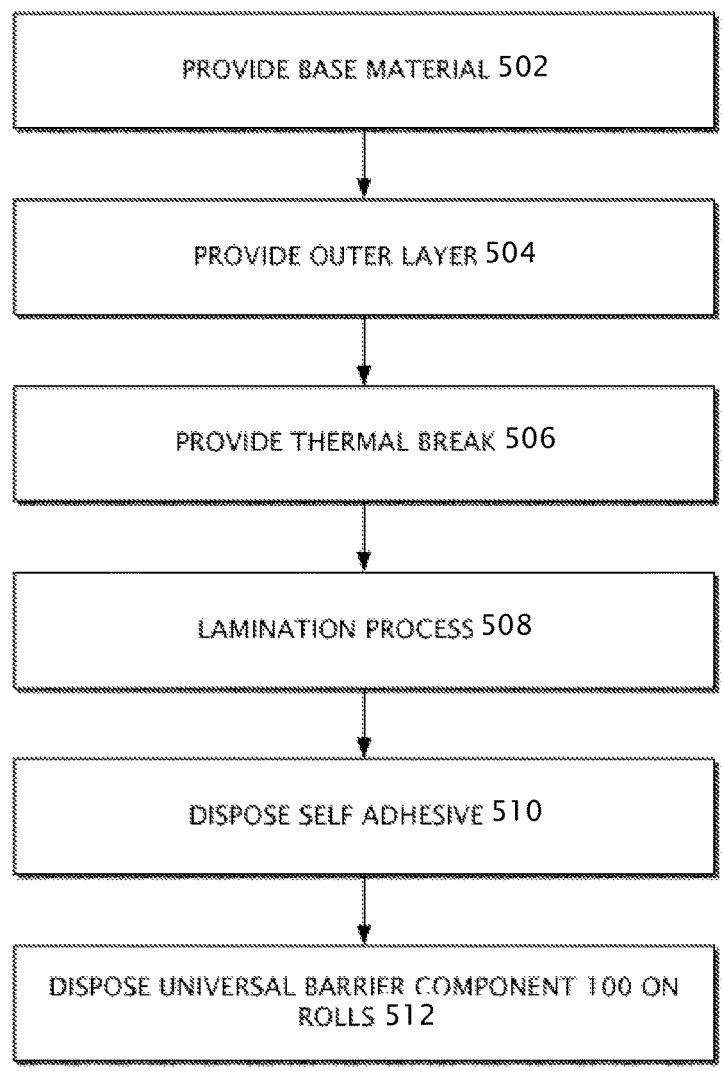
FIG. 5 is a flow diagram showing a method of producing a universal barrier component on rolls.

FIG. 5 is a flow diagram showing a method of producing a thermal barrier component. Universal barrier component is typically constructed on a laminating machine that assembles the 3 typical components (110, 108 and 106 of FIG. 2) previously described and disposes them on a roll. The adhesive (112 of FIG. 1) in the operational area may be disposed on the base material in this process or optionally in a second stage of processing.

At block 502 a vapor barrier base material is provided to the assembly machine. At block 504 an outer layer is provided to the assembly machine, and, at block 506 thermal break is provided to the assembly machine.

At block 508, the process disposes the thermal break material on the base material and also disposes an outer layer on top of the thermal break. Preparation of a thermal break material that utilizes a unique insulating material that includes air pockets disposed in a polyurethane material is detailed in FIG. 6. Alternatively, the lamination process for disposing the thermal break on the base material may utilize a standard spray or roller lamination process. In one example, a hybrid process of continuous molding may be utilized to dispose the insulation on the base layer. The process is a hybrid of conventional extrusion and blowing processes that tends to produce a flexible thermal break layer.

In the lamination process 508, the outer layer is typically bonded by conventional methods to the base material at the edges of the operational area. Thus, the thermal break is sealed against moisture and dirt and is disposed against a firm backing material provided by the base material. Next, a layer of self-adhesive is disposed at block 510 along the lap zone of the base material. And finally, at block 512 the universal barrier component is disposed on rolls for shipment and use.

Figure 6:
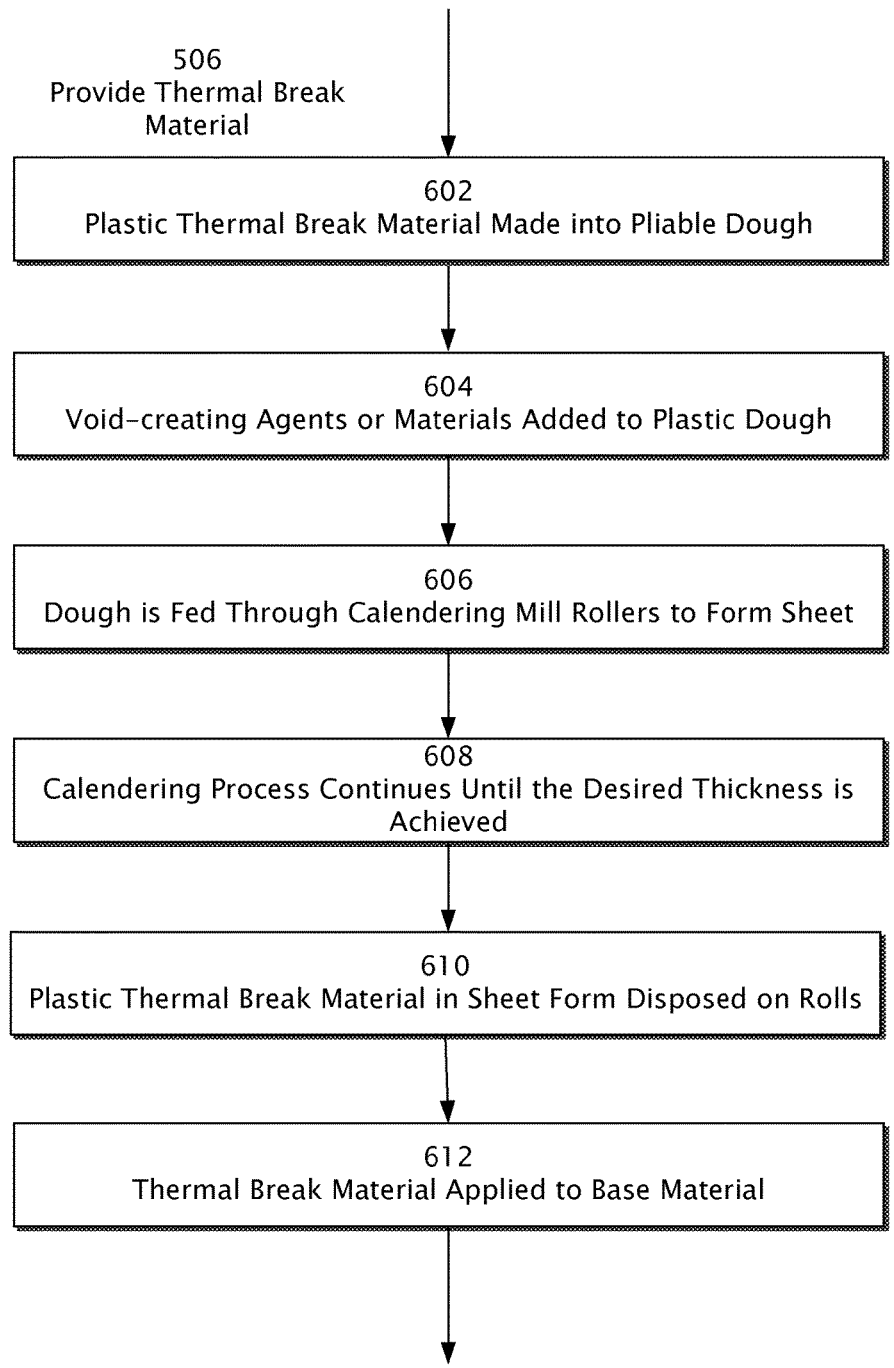
FIG. 6 is a flow diagram showing a method of producing a thermal break material

FIG. 6 is a flow diagram showing a method of producing a unique thermal break material made from a urethane base that includes microspheres for added insulation. Hollow glass microspheres (HGMs) may be introduced to polyurethanes (a class of polymer) to increase their insulative values. HGMs typically include an outer rigid glass and inner inert gas, which results in some unique properties, such as light weight and low thermal conductivity.

At block 602, a polymer thermal break material is formed into a pliable dough consistency. Polymers such as silicone and urethanes (or equivalently, polyurethanes) may be used. An excellent example that may be used is MILLATHANE® millable polyurethane rubber from TSE Industries, 4370 112th Terrace North, Clearwater, Fla. 33762, USA, or silicone foam or their equivalents. Polyurethanes may be made by reacting a diisocyanate with a polyol and typically a chain extender. Millable polyurethane may made from both polyester and polyether polyols. Diisocyanates including MDI, TDI, H12MDI and others are commonly used, along with many different chain extenders. Millable urethanes have properties comparable to castable or liquid urethanes, which may require different processing equipment and molding techniques. Millable polyurethanes can be processed on standard equipment such as internal mixers and rubber mills.

The polymers other than urethane and silicones which may be used include, for example, a rubber and a non rubber polymer. A rubber copolymer containing a component of cyclic or non-cyclic polyene having non-conjugated double bonds (such as butane-1, ethylidene norbomene, etc.), ethylene-propylene rubber, silicone rubber, fluorine rubber, acrylic rubber, polyurethane rubber, polyamide rubber, ethylene-propylene-diene rubber, Natural rubber, polyisobutylene rubber, polyisoprene rubber, chloroprene rubber, butyl rubber, styrene-ethylene-butadiene rubber, styrene-ethylene-butadiene-styrene rubber, styrene-isoprene-propylene-styrene rubber, and chlorosulfonated polyethylene rubber or their equivalents.

Non-rubber polymers that may be used other than silicone and urethane include, for example, polyethylene, polypropylene, acrylic polymer, polyvinyl chloride, ethylene-vinyl acetate copolymers, polyvinyl acetate, polyamide, polyester, chlorinated polyethylene, styrene polymers, and epoxy resins or their equivalents.

At block 604, materials or agents are added to the pliable dough to decrease the density by having a higher number of void spaces within the solid matrix. This novel use (higher void content to matrix) of mechanical voids (microspheres) greatly increases the thermal insulating value of the foam. As a result, very thin, flexible sheet on roll, down to 1/64" (or less) thickness can be used to insulate thermal heat transfer.

Hollow glass microspheres that have been chemically sodium depleted can be used in non-blown urethane foam composites. Possible microspheres that may be used include, for example, cenospheres (alumino silicate microspheres), plastic polymer microspheres, hollow glass microspheres, ceramic microspheres, carbon microspheres, composite and metal—aluminum and silver microspheres or their equivalents.

Insulating materials benefit from high void content. Insulating materials benefit even more with high volume void content microspheres (micro particles) or their equivalents which have diameters typically from 1 µm to 1000 µm. Hollow microspheres are available in glass, polymer and ceramic.

A hollow microsphere that is non expandable (or an expandable but could be calendered without expanding) or its equivalent would be introduced to the plastic dough ball. A hollow microsphere agent to plastic matrix ratio of much higher void to matrix would achieve a thermoplastic sheet with the following improvements and new use for an existing material.

At block 606, the microsphere loaded pliable dough is fed through typical calendering mill rollers to form a sheet. In calendering, the material is compressed between two rolls that press it out into a film. The film then passes around one or more additional rolls before being stripped off as a continuous film. The thickness of the film is determined by the gap between the compression rollers, in which the gap between the calender rolls can be incrementally decreased, and the film run through them multiple times to create the desired thickness.

At block 608, the calendering process from block 606 is continued while periodically decreasing the space between the rollers. The process is continued until the sheet of thermal break material is of the thickness desired.

At block 610. The sheet of thermal break material is disposed on rolls to facilitate further handling. Alternatively, the sheet of thermal break material may be disposed directly onto the base material at block 612.

Figure 7:
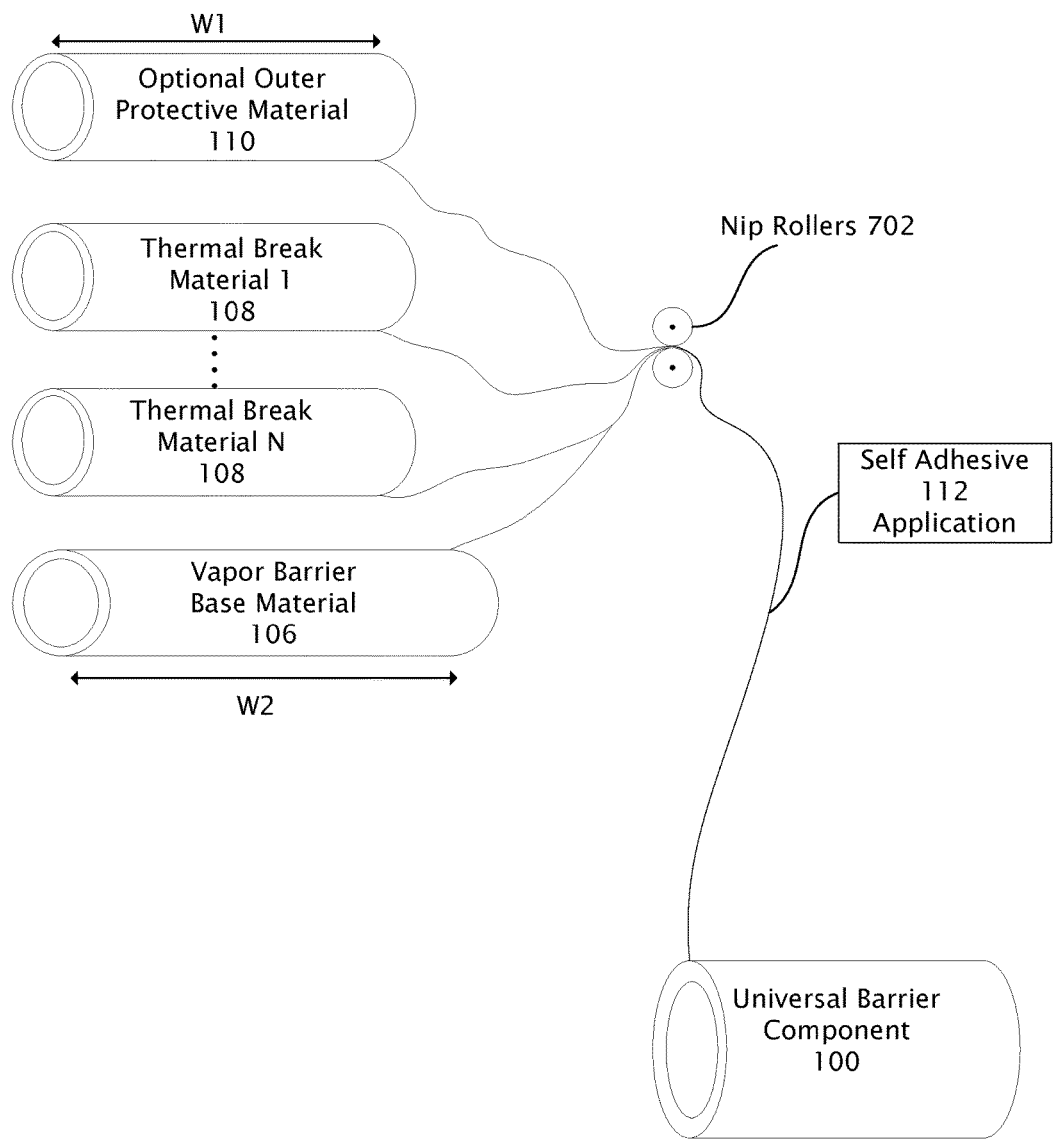
FIG. 7 is a diagram showing a method of laminating materials to create a universal barrier component.

FIG. 7 is a diagram showing a method of laminating materials to create a universal barrier component. Shown are rolls containing the optional outer protective material 110, and one or a multitude of thermal break materials, 108. These rolls have a width, W1, which is narrower than the width W2, of the vapor barrier base material 106 in order to provide for the lap zone (not shown). In one construct, W1 is substantially 48 inches and W2 is substantially 54 inches. The resulting lap zone is then substantially 6 inches.

The thermal break material rolls may be of urethane or silicone matrix with high void to matrix content as produced in FIG. 6, for example, or of any other appropriate polymer material and void creating material. The thermal break material 108 is laminated to the polyethylene vapor barrier base layer 106 with the optional outer protective layer 110, and disposed on rolls for use. While two layers of thermal break material are shown, multiple layers of each could, for example, be used to increase the thermal insulating value dependent on purpose and code requirement.

By combining differing thermal break materials with differing thermal properties and void ratios, the resulting material is highly restrictive of heat flow and provides an improved thermal break. The compounded properties of thin walled flexible, highly insulative high void to matrix foams laminated together is novel to the building industries.

Adhesives may be used to provide a flexible bond between the laminations. The adhesives that may be used include, for example, a rubber or non-rubber adhesive that provides a flexible bond to the laminations, seams and edges. The flexible bond between layers of materials during the lamination process can be applied by, for example, spray application, roller application or a pressure sensitive adhesive (PSA) disposed on the roll material prior to lamination and activated by the nip rollers (series of rollers to apply pressure) during the lamination process.

Other adhesives that may be used include, for example, latex (water based) adhesives that provide a flexible rubber based bond or their equivalent. To further improve the insulative properties of the universal barrier component, the adhesive could also be modified by the inclusion of microspheres of with a diameter range typically from 1 µm to 1000 µm. The adhesive that may be used, could, for example, include microspheres at a higher void to matrix ratio of microspheres to latex and or their equivalents.

Existing adhesives utilizing microspheres have a low void to matrix ratio. By using an adhesive with a higher void to matrix of the adhesive itself, benefits are attained with the flexible bond of adhesion.

These materials may be laminated with nip rollers 702 (a series of rollers to apply pressure to the multiple sheets). An adhesive 112 may be applied to the lap zone prior to disposing the universal barrier component 100 onto rolls. Alternatively, the adhesive may be applied at another time. The adhesive may be applied using any appropriate conventional process, and the adhesive may be protected using a non-stick backing or other appropriate material.

Figure 8:
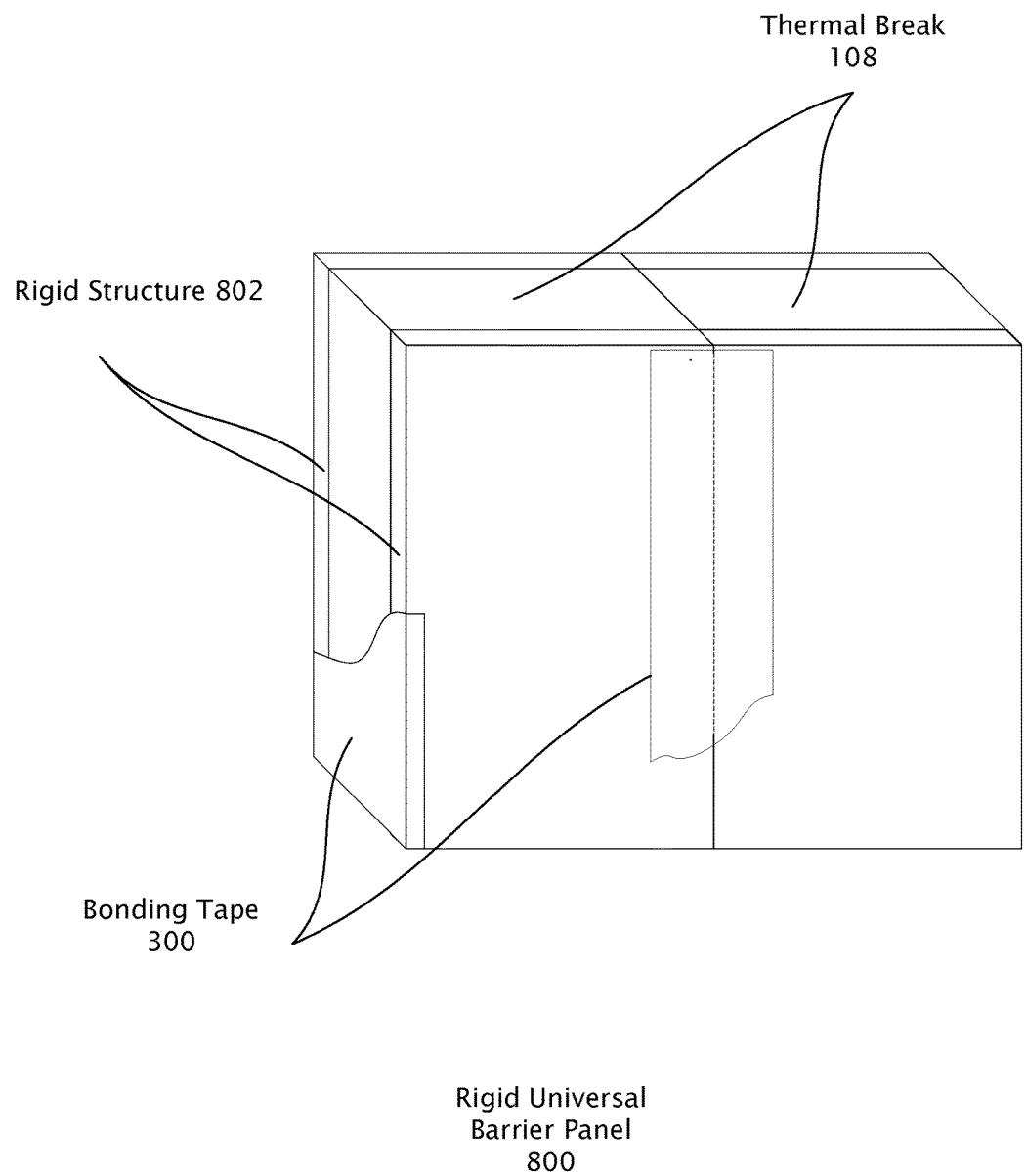
FIG. 8 is a perspective view of a rigid universal barrier component panel.

FIG. 8 is a perspective view of rigid universal barrier component panels 800. In this construct, the operational area of a universal barrier component 100 is sandwiched between two rigid, or structural components 802 to create a panel that could be used for construction called a structurally insulated panel (SIP or SIP's). If desired, the edges of the panel may be sealed with bonding tape 300. Additionally, bonding tape 300 may be used to form a seal between multiple panels used to form a larger construct.

Figure 9:
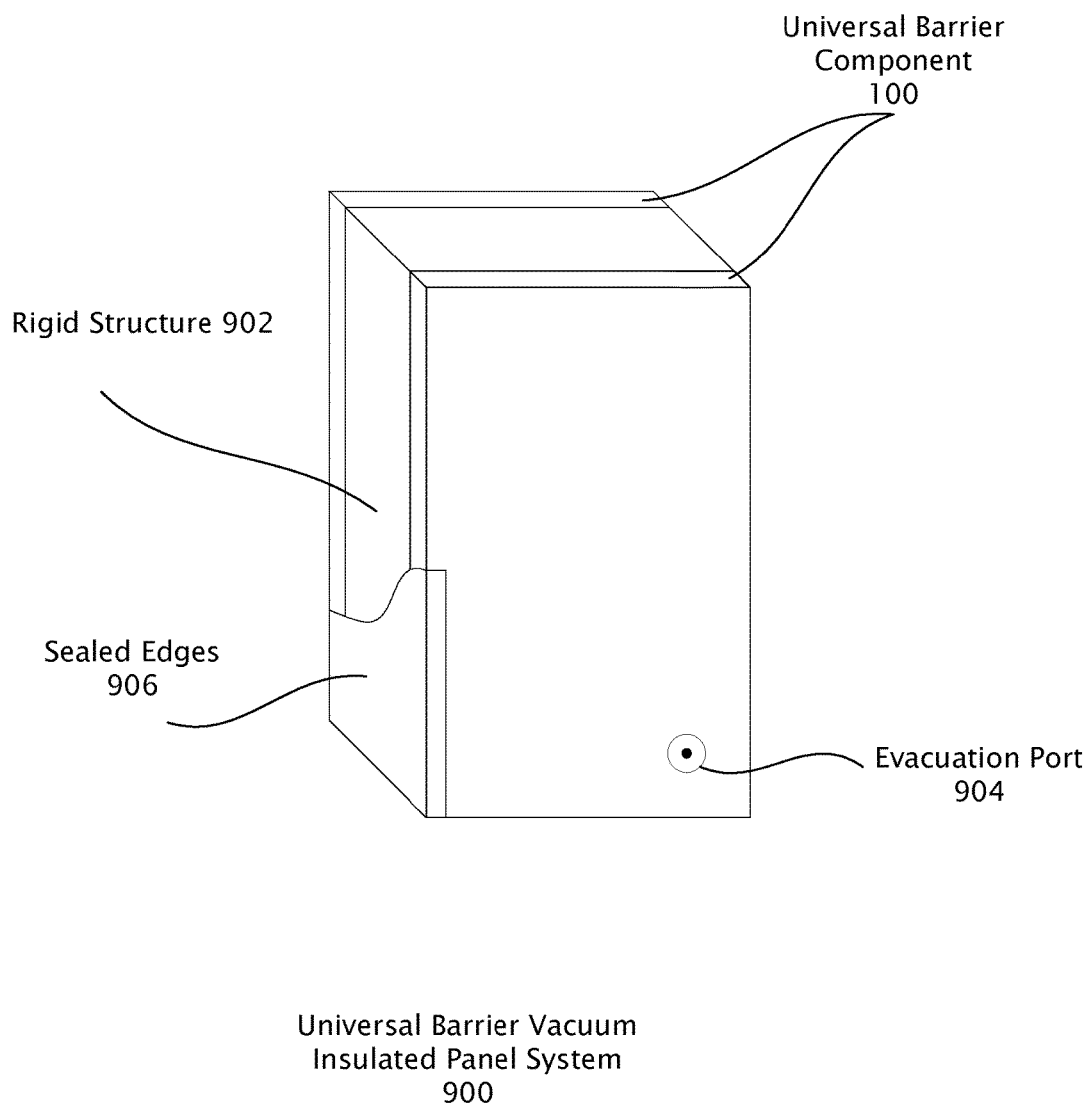
FIG. 9 is a view of a universal barrier vacuum insulated panel system.

FIG. 9 is a view of a universal barrier vacuum insulated panel system. An example of an additional construct that can be created with universal barrier system components is a Universal Barrier Vacuum Insulated Panel System (VIPS). In this Universal Barrier VIPS, the universal barrier sheet material 100 would be used on either side of a core material 902. A good example for this core material would be the web honeycomb cell from Hexcel (Hexcel.com) or similar.

These core materials can be made in any shape required for use and the universal barrier system conformed around it. Although a rectangular panel is shown in FIG. 9, any shape, such as curved panels and the like may be utilized. After enclosing the core material of the VIPS with the operational area of the universal barrier insulating sheet material 100, and sealing the edges with bonding tape or its equivalent 300, the vapor (gas, air or inert gas such as krypton or its equivalent) within the structural rigid panel may be vacuumed (evacuated) out from an evacuation port 904 to create a negative pressure environment within the structure, thereby improving its insulating properties.

Multiple VIPS may be joined together and the joints, or seams sealed with bonding tape or its equivalent 300. In the VIPS construct, the universal barrier component provides a thermal break, a vapor barrier, a moisture barrier, and an acoustic barrier to the vacuum insulated panel system while insulating and isolating the core from the outer skin or shell.

If desired, the VIPS may be covered in an outer skin (not shown) to protect the universal barrier components and or provide another desired function. A good example (like the fabric used on stealth aircraft) of an exterior skin could be a woven fabric like HexForce® (Hexcel.com) or other composite structure fabric or solid shell or their equivalents. An infinite number of shapes, designs and functions open the possibilities for a Universal Barrier VIPS.

While this VIPS is directed at building constructs, it is not limited to conventional residential, commercial and industrial structures. Aerospace industries could benefit from thinner, stronger, better insulated materials designed for the future. This VIPS material could help pioneer new shapes for all types of constructs like exoskeletal components or buildings utilizing these materials as deep sea creatures such as lobster or crab utilize chitin, with the shapes and strengths not currently available in building materials.

This VIPS material could be used in extreme environments like Antarctica or below sea level. Once these environments are explored, it is logical to look to extra terrestrial for space exploration and extended living colonies or their equivalents. Other more obvious applications of the VIPS for vehicles, permanent and mobile structures, craft for air, sea (above and below the surface) and space all fall into lifesaving equipment.

Figure 10:
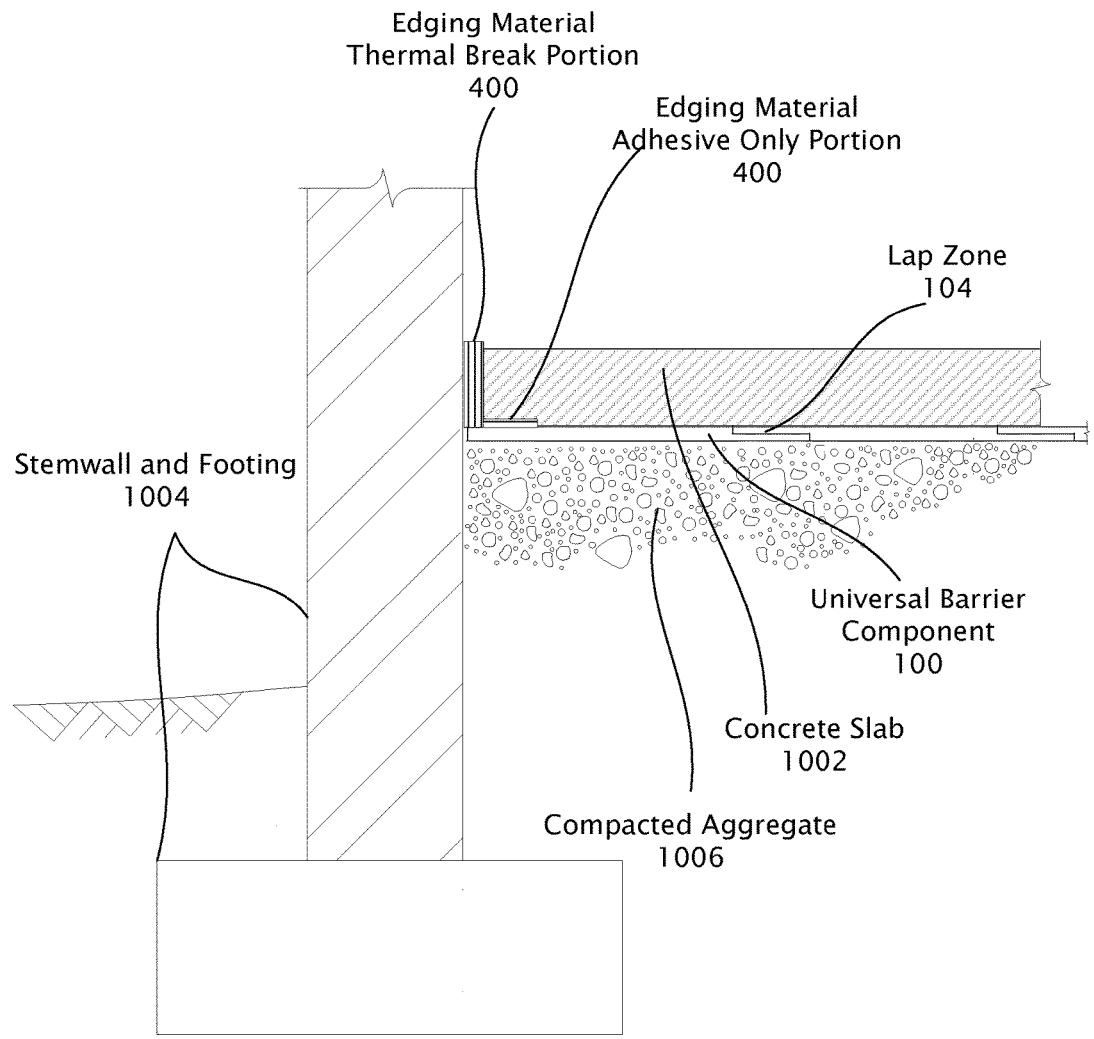
FIG. 10 is a section view where universal barrier system is used with a concrete slab floor.

FIG. 10 is a section view of a concrete slab floor. Common applications of a universal barrier system include the concrete industries specifications for pouring of slab for flooring. In this application the large wide rolls of Universal Barrier component sheet material 100 would be applied to the prepared surface (ground). In this example, the rolls may be, for example, substantially 54 inches wide with a substantially 48 inch operational width and a substantially 6" lap zone 104. This surface (ground) is typically prepared by earth moving equipment, plumbed for utilities and leveled to specified slope on grade with a compacted aggregate 1006. The universal edging material 400 is used where the horizontal material of the first element, the universal barrier sheet material 100, meets a vertical surface like the stem wall 1004 or load bearing structure like a column or pillar. The edging material 400 is installed with the portion containing only the adhesive in contact with the universal barrier sheet component 100, and the portion containing the thermal break material in contact with the vertical portion of the building's foundation 1004.

This edging material 400 provides a material to address small areas and detail the vertical perimeter of the larger areas covered by the universal barrier sheet component 100, completing the thermal, vapor, moisture and sound attenuation for the concrete floor without loss of integrity of any of those functions. Applications for the universal barrier system include but are not limited to building industries.

Figure 11:
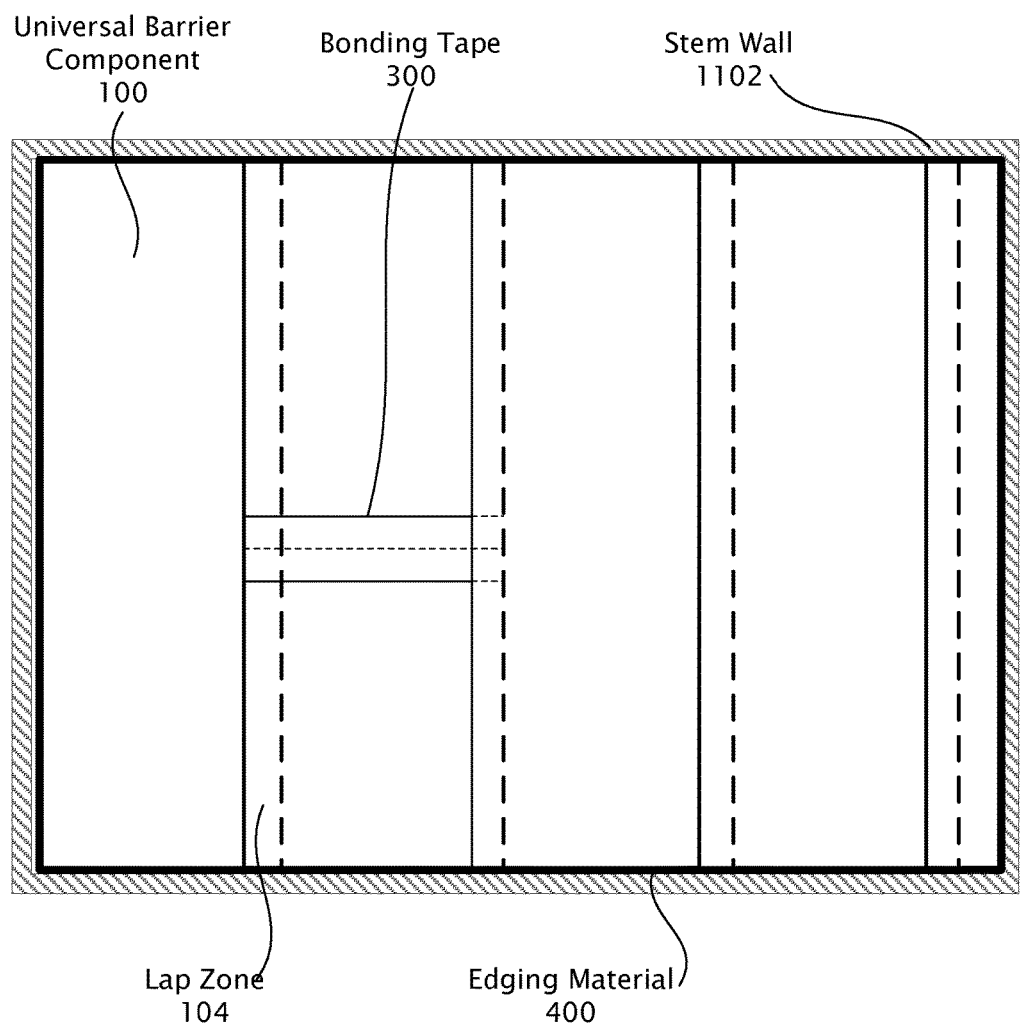
FIG. 11 is a plan view of use of a universal barrier system is used with a concrete slab floor.

FIG. 11 is a plan view of use of a universal barrier system is used with a concrete slab floor prior to installation of the concrete slab. As shown in FIG. 10, the universal barrier sheet component 100 covers the bulk of the prepared surface, with adjacent sections of the sheet component 100 containing the lap zone 104, which maintains the thermal, vapor, moisture, and sound attenuation throughout the surface. The universal barrier bonding tape 300 is utilized to close seams (as in a width butt joint) of two sections of Universal Barrier sheet component 100 end to end and for seaming custom fabrications.

The universal barrier system edging material 400 is applied to the universal barrier sheet component to close the junction between the sheet component 100 and the stem wall 1102. Additionally, the universal barrier system edging material may be applied to any penetration, such as those for utilities and other load bearing structures.

Figure 12:
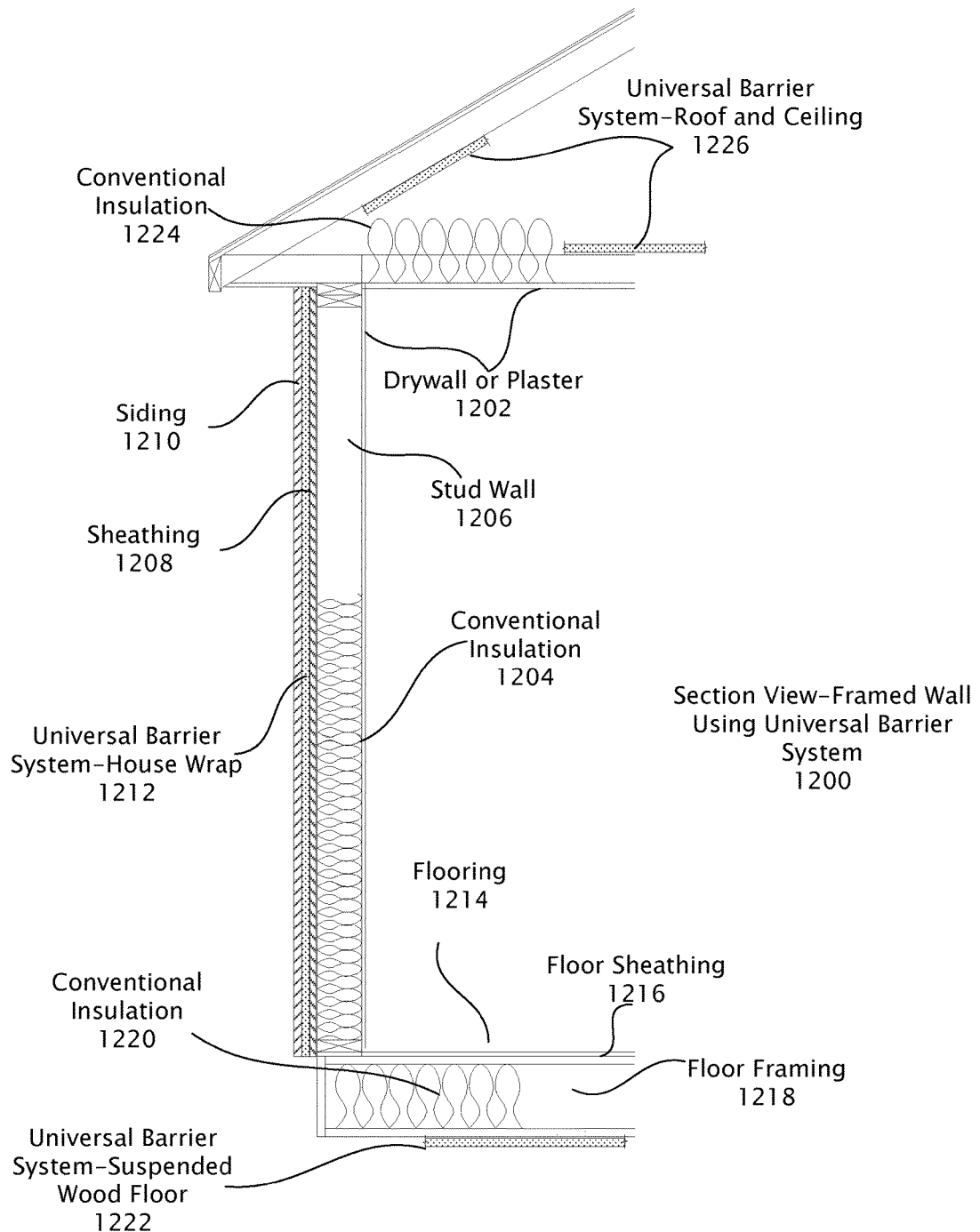
FIG. 12 is a section view of a house wall.

FIG. 12 is a section view of a house wall 1200 with a roof and suspended wood floor utilizing the universal barrier system. Wall applications or ceiling/roof applications can be addressed with the universal barrier system for thermal break, vapor barrier, moisture barrier, and sound attenuation functions. In all applications for the building industry, the universal barrier system provides a complete set of materials for large areas, seams, and custom fabrication as well as small areas detailing the edges of the larger areas while maintaining the integrity of the thermal, vapor, moisture, and sound barrier functions. Although only the universal barrier component for large areas are shown in FIG. 12, one skilled in the art will recognize the utility of the bonding tape component and the edging material component in creating and maintaining the thermal, vapor, moisture, and sound attenuation features of the universal barrier system, and provide for establishing and maintaining the universal barrier properties at doors, windows, and utility penetrations, for example. The entire building envelop can be addressed with the universal barrier system.

The use of the universal barrier system in a framed wall for providing thermal, vapor, moisture, and sound barrier is shown. A conventional wall is comprised of a layer of drywall or plaster 1202 on the inner surface of the stud wall 1206. On the exterior of the stud wall is the sheathing 1208 and the siding 1210. Conventional insulation 1204, either foam or batting, is typically installed within the stud wall between the studs, and a house wrap is typically installed between the sheathing 1208 and the siding 1210.

By using the universal barrier system 1212 to replace the house wrap, the conventional house wrap and the conventional insulation may be dispensed with. The universal barrier system includes materials to cover large areas, seams, and custom fabrication and small area detailing around windows, doors, and other penetrations to the building envelop. The universal barrier system 1212 provides a continuous barrier to the building envelope, including at the studs and other framing components In addition to providing an improved barrier to thermal, vapor, moisture, and sound effects, elimination of the use of conventional insulating materials may have health benefits to both construction workers and home owners in that the use of toxic materials such as isocyanurates and hazardous materials like fiberglass are eliminated.

The universal barrier system also can be used for framed floors 1222. The flooring system is typically comprised of the flooring 1214, such as wood, tile, or carpet and an underlayment on top of floor sheathing 1216. The flooring and sheathing are attached to the floor framing 1218, such as engineered floor joists or dimensional lumber. Typically, conventional insulation 1220 is disposed within the spaces between the framing, leaving the joists uninsulated. Use of the universal barrier system with a suspended wood floor 1222 provides similar advantages as described above for walls The construction of ceilings and roofs is similar to that of walls and suspended floors and the use of the universal barrier system 1226 with floors and ceilings provides similar advantages to its use in other aspects of building construction. The universal barrier system can be applied to either the ceiling joists or bottom chord of a truss system, or to the rafters.

From the previous discussion, it is obvious that the universal barrier system provides advantages in retrofitting existing construction with improved energy efficient materials as well as being utilized in new construction. The universal barrier system is designed to be easy to use, intuitive, quickly mastered to expert level installation, easily handled by one or two users, energy efficient and sustainable.

Those skilled in the art will recognize that although the present examples are directed to the use of the Universal Barrier System in the building industries, its use is not limited to solely that application and can be used in a multitude of industries.

The lamination process for disposing the thermal break on the vapor barrier base material may utilize a standard spray or roller lamination process. In one example, a hybrid process of continuous molding may be utilized to dispose the insulation on the base layer. The process is a hybrid of conventional extrusion and blowing processes that tends to produce a flexible thermal break layer.

The universal barrier components tapes and edgings may be configured in a universal barrier system. The universal barrier system may be advantageously applied to a number of applications and configurations as described below.

A vapor barrier (or equivalently a vapor retarder) may prevent vapors, gases and moisture from entering a structure. Under slab vapor barriers such as the universal barrier system may be used on grade construction beneath conditioned space or on grade construction covered with a moisture sensitive flooring. In a building without a moisture protection system, the majority of the moisture within the building may originate from the building sites' ground water. Ground water may enter a building through a slab on grade, or below grade walls, via hydrostatic pressure, capillary action or vapor migration. Moisture infiltration through a slab on grade or walls below grade, may cause indoor air quality issues due to the proliferation of mold, mildew and fungus. It may also cause damage to the slab and increased building heating costs because of the increased thermal conductivity of a moist slab. And finally, excess moisture may cause flooring system failures. Installation of a universal barrier system may help to remedy these problems.

Preventing moisture infiltration with a universal barrier system may be important in preventing flooring failures. In flooring problems, failure can be evidenced by adhesive failure, warping, discoloration, deterioration and rust stains, and the like. For example, carpeted floors can wrinkle, wood floors may buckle, and painted floors, such as epoxy coated floors, may bubble. Hydrostatic pressure may be relieved by proper site drainage or by providing a water proofing barrier, such as the universal barrier system. Capillary action may be minimized by capillary break layer, or by installing a water proof barrier. And finally, vapor pressure may be reduced by installing a vapor barrier. The universal barrier system may function as a capillary break layer, a waterproof barrier and a vapor barrier. Not all materials that are water proofed are vapor proofed, however, all materials that are vapor proofed are water proofed. An example is fabric having a mechanically expanded layer of polytetrafluoroethylene, which allows water vapor in the form of perspiration to evaporate, but prevents water from coming through the fabric.

There are a number of industry codes and standards regarding vapor and moisture barriers. The American Society for Testing Materials ("ASTM") has issued ASTME 1993-98 Bituminous Vapor Barriers, ASTME 1745-97 Plastic Vapor Barriers and ASTME 1643-98 Standard Practice for Vapor Barriers. In addition, the American Concrete Institute ("ACI") has issued standard ACI 302-1R-96. In particular the universal barrier system typically exceeds the Architectural and Building Codes for Vapor Barriers, as well as meeting or exceeding the ACI 302-1 vapor barrier specification for 2006 or its equivalent.

Under slab vapor barrier materials may include low density polyethylene (LDPE) membranes, composite LDPE and asphalt coated craft paper membrane, state of the art LDPE membranes (including polyolefin), cross laminated LDPE membranes, high density polyethylene (HDTE) membranes, fiber reinforced composite LDPE membranes, and multi-ply bituminous membranes. These materials have typically been supplied as a single material disposed underneath a slab. Utilization of the universal barrier system typically outperforms these materials.

When used as a floor, concrete keeps out most liquid water. However, concrete is porous, therefore, some moisture may wick up through the slab and transpire into the air. To mitigate this, a thick cross laminated, high density polyethylene vapor barrier may be used under a concrete slab. High density polyethylene vapor barriers are typically installed on top of a layer of stones that promote drainage, with the high density polyethylene vapor barrier being in close contact with the underside of the concrete.

Building footings are in general, not insulated. Insulated footings can provide a thermal break to reduce condensation, or mold growth inside a building. Insulating the footing tends to keep the concrete on the inside of the structure at the same temperature as the air inside, thus, preventing condensation. Thus, disposing the universal barrier system on a footing may tend to improve the thermal performance of a footing. In addition, the universal barrier system may be coupled to a universal barrier system disposed underneath a floor or slab to form a continuous barrier.

Structural components such as a window lintel, the edge of a concrete floor slab, or a wood stud in an exterior frame wall can act as thermal bridges conducting heat flow around insulation. A thermal break is an insulating material intended to prevent structural components (such as concrete floors, and studs) from acting as thermal bridges. A thermal break typically provides a layer of insulation that tends to resist heat flow through a thermal bridge. To provide a thermal break, walls are typically assembled from the inside out using drywall, studs, insulation in the cavities, Styrofoam, SOB, siding and the like. Thermal breaks may be spray on insulation which is susceptible to damage by the sun and may allow the intrusion of termites into the structure. The universal barrier system advantageously provides a thermal break in addition to its moisture resistance to reduce thermal bridging of heat from a warmer area to a cooler area.

A universal barrier system may be part of a building envelope. A building envelope can include a universal barrier system to limit water infiltration into unwanted areas and allow drainage and drying of wetted building materials. A typical moisture barrier system can include roof coverings, underlayment, overhangs, gutters, valleys, flashings, house wrap (or felt) and the universal barrier system. Many of these components may utilize a universal barrier system. A universal barrier system tends to resist the passage of both air and moisture through floors, walls and ceilings. To work properly, the universal barrier system should be continuously disposed. There should be no tears or gaps near electrical receptacles, windows and the meetings of walls, ceilings and floors. The operational area having a self-adhesive edging promotes a continuous universal barrier system by allowing adjoining universal barrier components to couple to each other. Also, tapes provide a way to seal edges not having a convenient lap zone.

The invention claimed is:

1. A universal barrier system for forming a moisture shield and thermal break in a building comprising:
- a universal barrier tape made from polyethylene film, up to 12 inches wide to provide typically 6 inches of lap with an adhesive disposed thereon;
- a plurality of universal barrier components supplied in a roll form for use at a job site, each universal barrier component of the plurality of universal barrier components substantially fifty four inches wide in which the universal barrier component includes:
  - a common base component of polyethylene film substantially 6 to 15 mills thick and substantially 54 inches wide and of a length that varies depending upon a desired roll size upon which the common base material is disposed,
  - a thermal break having a thickness substantially ranging from 5 mils to 50 mils, and substantially 48 inches wide and made from millable polyurethane foam containing voids created by microspheres disposed in an operational area substantially forty eight inches wide, beginning at an edge of the common base component and leaving a substantially uncovered area substantially 6 inches wide along an opposite edge as a lap zone for joining to other materials;
  - a first protective outer layer of polyethylene film substantially 48 inches wide and disposed over the thermal break and has a thickness substantially ranging from 3 mils to 40 mils; and
- a universal barrier edging including
  - a base material of polyethylene film substantially 6 to 15 mills thick, and substantially 12 to 14 inches wide and including:
    - an insulating material made from millable polyurethane foam containing voids created by microspheres substantially six to eight inches wide disposed along an edge of the base material and
    - a second protective outer layer of polyethylene film disposed over the insulating material and has a thickness substantially ranging from 3 mils to 40 mils;
- whereby the plurality of universal barrier components and the plurality of universal barrier edging may be assembled with the universal barrier tape to maintain a thermal and insulation layer in various shapes in building construction in which the universal barrier system is disposed.

2. The universal barrier system for building construction of claim 1, in which the lap zone further comprises an adhesive disposed thereon.

3. The universal barrier system for building construction of claim 1, in which the protective outer layer covers the thermal break so that it is not exposed.

4. The universal barrier system for building construction of claim 1, in which the microspheres are hollow glass microspheres that have been chemically sodium depleted and in which the microspheres are between 1 μm and 1000 μm.

5. The universal barrier component of claim 1 further comprising an adhesive disposed in lap zone.

6. The universal barrier system for building construction of claim 1, in which the microspheres are hollow glass filled with an inert gas.

* * * * *